No. 25,771. PATENTED OCT. 11, 1859.
J. A. STEPHAN.
ADJUSTABLE RAIL FOR REPLACING CARS ON THE TRACK.
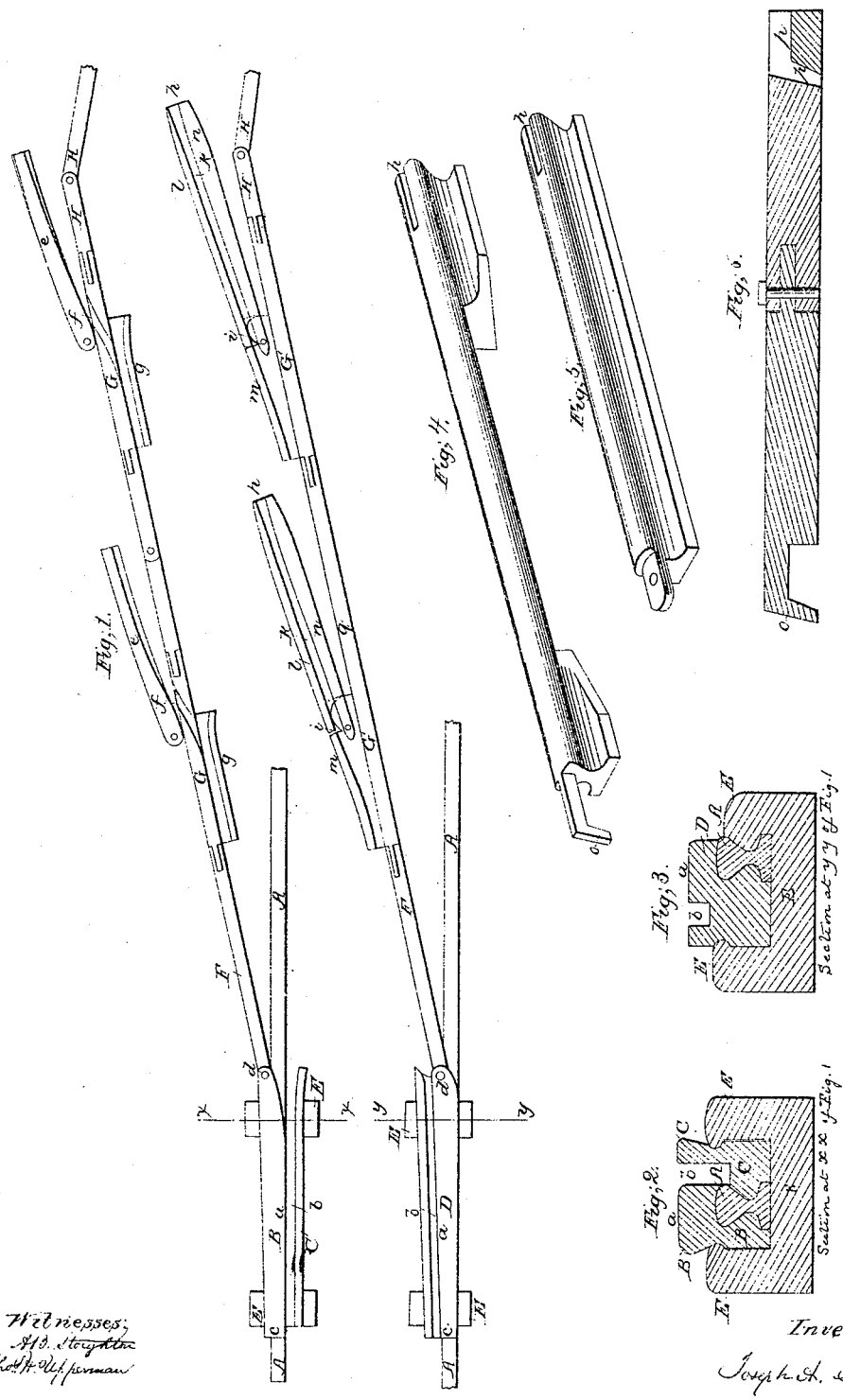

UNITED STATES PATENT OFFICE.

JOSEPH A. STEPHAN, OF LA FAYETTE, INDIANA.

ADJUSTABLE RAILS FOR REPLACING CARS ON THE TRACK.

Specification of Letters Patent No. 25,771, dated October 11, 1859.

*To all whom it may concern:*

Be it known that I, JOSEPH A. STEPHAN, of La Fayette, in the county of Tippecanoe and State of Indiana, have invented certain new, and useful Improvements in Portable Adjustable Rails for Replacing Cars on the Track; and I do hereby declare the following to be a full, clear, and exact description of the construction and operation of the same, reference being had to the accompanying drawings, making a part of this specification, in which—

Figure 1, represents the manner of uniting the portable adjustable rails to the main track, and extending them out to where the car or engine may be. Fig. 2, represents on an enlarged scale, a cross section taken through the red line $x$ $x$ of Fig. 1. Fig. 3, represents a similar cross section taken at the red line $y, y$, of Fig. 1. Figs. 4, 5, and 6, represent detached portions of the rails which will be specially referred to hereafter.

Similar letters of reference where they occur in the separate drawings denote like parts of the contrivance in all the figures.

I am aware that portable adjustable rails have been used for replacing cars upon the track, but they are deficient in many respects. They do not take all the wheels of the car or engine at once. They do not carry the flanges of the wheels over the permanent rails of the track with ease, and the consequence is that the journals of the axles are bent or strained so as to make the car useless until repaired.

My invention consists in the manner in which I unite my temporary track with the main track, and arrange and extend it out to the wheels of the car to be replaced, so that it will serve all the purposes of a track, switches, and frogs, and the car readily run up upon it onto the main track, as will be explained.

A, A, represent portions of the permanent rails of a main track of a railroad. To replace a car upon it, that has been thrown off by any cause, I proceed as follows: I first apply the fish or frog pieces B, C, D, to the two rails and clamp and support them at the proper points in the line of the track by the clamp blocks E, E, which rest on the ground or some other support, and which are driven up on the wedge or tapering fish pieces, holding them rigidly to the rails. I now have a track above the tops of the permanent rails A, A, with a tread at $a, a,$ and groove at $b, b,$ to receive the flanges of the wheels when the car is drawn over them. The top surfaces $a, a,$ of these fish pieces run down at the points $c, c,$ so as nearly to run out where the wheels join the permanent track. Having thus arranged the starting points, I fasten onto these fish pieces at $d, d,$ the sections F F (one, two, three, or more) until I reach near to the first pair of truck wheels of the car to be replaced. I then put on the sections G, G', the one G, having a switch $e$, pivoted to it, a groove $f$, cut through it deep enough to allow the flange of the wheel to pass, and a guard $g$ to direct and keep the wheel on the sections. The other G', has a switch $h$ pivoted to it by a rule joint hinge $i$, which switch has a groove $k$ formed in it to receive the flange of the wheel, a guide rail $l$, which meets a guide rail $m$ on the section G', and a tread rail $n$. These switches taper or incline wedge-fashion down to their points so that the wheels will readily take onto them, and their treads may be roughened to prevent the wheels from slipping. I next put down duplicates of the sections G, G', for the next pairs of wheels. Then continuing on my plain track until I arrive at the next or farthest truck of the car, I put down duplicates of G, G', and thus I have a temporary track constructed to every pair of wheels, and the track possesses all the elements of switches and frogs, for running the car upon the main track. And should it be necessary to run the engine itself out on the temporary track it may be done, additional sections such as I represent at H H, being put on to receive the engine. This may be necessary when the car is so slued around as to require it to be run up onto the temporary track rear end foremost instead of the way represented.

The object of raising the fish pieces B, C, D, above the tread of the rails A, is to get sufficient height to allow the flanges to pass over the tops of the permanent rails without striking them. I call the pieces B, C, D, fish pieces because they are formed to fit into the waists of the rails A, and thus be more readily clamped to them.

Fig. 4, represents one of the sections I use where my temporary track crosses over one of the permanent rails. It is cut away underneath so as to come down level with the other sections, and still carry the flanges over the permanent rail. Fig. 5, represents in perspective and on an enlarged scale one of the simple sections F, for extending the track. Fig. 6, represents on an enlarged scale a section through the pieces H, simply to show, the shape of the hooks *o*, and mortises *p*, by which I unite the sections.

The section G', it may be proper to remark, has a longer rail *q*, connected with it, than its fellow G.

The track being laid down as shown in Fig. 1, a car may be run up upon it as readily as it could into or onto a siding or turnout—every wheel starting upon a permanent piece which conducts it onto the track thus temporarily made, and thence onto the main track. The sections can be carried with the train, and can be laid down and taken up in a very few minutes.

Having thus fully described the nature and object of my invention what I claim therein as new is—

1. The fish pieces B, C, D, clamped to the permanent rails A, A, and elevated high enough above said rails, to carry the flanges of the car to be replaced, over them, substantially as described.

2. And I also claim in combination with an elevated temporary track, secured to, and high enough above the permanent track, to carry over the flanges of the wheels, the sections G, G', and their switches *e, h*, extending to each of the pairs of wheels of the car, said sections having all the elements of switches frogs and rails, substantially as described.

JOSEPH A. STEPHAN.

Witnesses:
A. B. STOUGHTON,
THOS. H. UPPERMAN.